(No Model.) 2 Sheets—Sheet 1.
E. WOODWARD.
CLUTCH.
No. 540,378. Patented June 4, 1895.
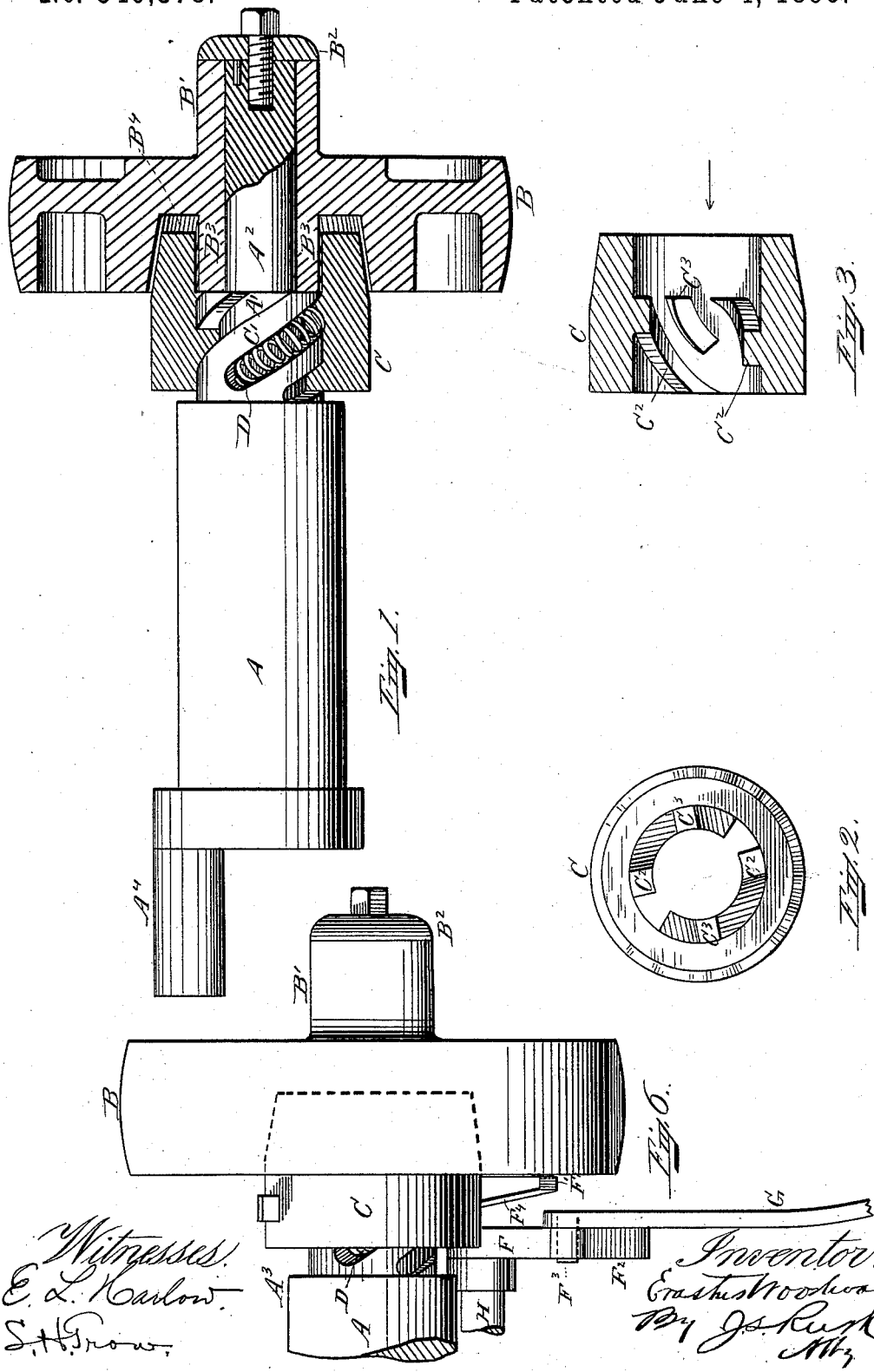
Witnesses
E. L. Harlow
S. H. Frow
Inventor
Erastus Woodward
By J. S. Rusk
Att'y (No Model.) 2 Sheets—Sheet 2.
E. WOODWARD.
CLUTCH.
No. 540,378. Patented June 4, 1895.
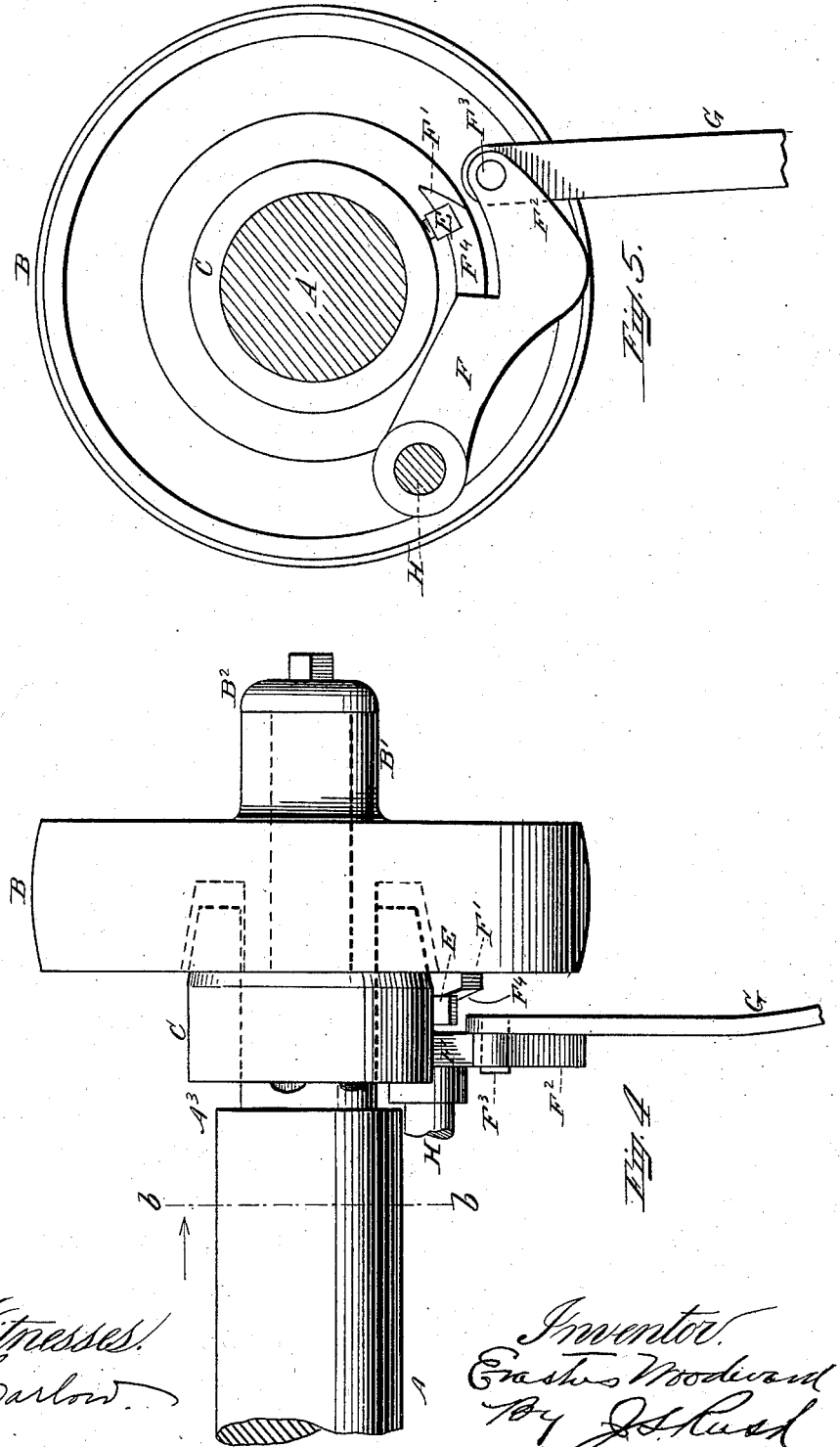
Witnesses
E. L. Harlow
S. H. Trow
Inventor
Erastus Woodward
By J. A. Rush
Atty

UNITED STATES PATENT OFFICE.

ERASTUS WOODWARD, OF SOMERVILLE, MASSACHUSETTS, ASSIGNOR TO THE WOODWARD MANUFACTURING COMPANY, OF SACO, MAINE.

CLUTCH.

SPECIFICATION forming part of Letters Patent No. 540,378, dated June 4, 1895.

Application filed January 25, 1895. Serial No. 536,184. (No model.)

*To all whom it may concern:*

Be it known that I, ERASTUS WOODWARD, of Somerville, county of Middlesex, and State of Massachusetts, have invented new and useful Improvements in Clutches, of which the following is a specification; and I hereby declare that the following is a full, clear, and exact description of the invention, which will enable others skilled in the art to which it appertains to make and use the same.

My invention has for its object to produce an improved friction movement by which a shaft can be connected to and disconnected from the driving pulley, which gives it motion, and my invention consists of certain novel features, arrangements and combinations hereinafter described and particularly pointed out in the claims.

In the accompanying drawings, which form a part of this application, Figure 1 is a side elevation of the shaft, with the driving-pulley and other parts in section. Fig. 2 is an end view of Fig. 3, looking in the direction indicated by the arrow shown in Fig. 3. Fig. 3 is a central longitudinal section through the engaging-block by means of which the driving-pulley and shaft are connected. Fig. 4 is a side view of the shaft, driving-pulley, and connecting parts, showing the location of the parts when the shaft is disconnected from the driving-pulley and with the releasing device in its upper position to cause said disconnection. Fig. 5 is a cross-section on the line $bb$, Fig. 4, and showing the releasing device by which the driving-pulley and shaft are disconnected. Fig. 6 is a side elevation of a portion of the shaft, driving-pulley, nut, and releasing device by which the driving-pulley and shaft are disconnected and showing the position of the parts when the shaft and driving-pulley are connected with the releasing device in its lower position.

Like letters of reference refer to like parts throughout the several views.

In the drawings A represents the shaft to which power is to be applied, and at one end it has a portion A' of diameter less than the main portion, and beyond that portion A' there is a continuation $A^2$ of further reduced diameter, and at the opposite end there is provided a crank shaft $A^4$, by which the motion of the shaft A is communicated to perform work.

On the portion $A^2$ of the shaft A there is loosely mounted the driving pulley B, and the hub thereof is provided with a rearward extension B' extending outwardly and contacting with a washer $B^2$ secured to the end of the shaft by a screw or other suitable device, and said hub has an inward extension $B^3$ which contacts with and bears against the shoulder of the portion A' of the shaft A.

In the inner face of the driving pulley B there is provided a circular groove $B^4$, in which the engaging block C is adapted to move inwardly and outwardly, and when in its inner position, as shown in Fig. 6, forms a fixed clutch with the pulley B.

On the portion A' of the shaft A there are arranged four spirals C', which are spirally arranged from the front to the back of said portion.

On the interior of the engaging block C there are provided two threads $C^2$, which extend a little over one-half the length of the engaging block, and two threads $C^3$, which are about one-half the length of the threads $C^2$. These threads are adapted to fit in between the spaces formed between the spirals C' on the portion A' of the shaft, and in the spaces where the half spirals fit there are two spiral springs D, which bear against one end of each half spiral, and at the other end against the upper end of the space formed between two of the spirals (see Fig. 1), and the tendency of said springs is to cause the unwinding of said engaging block from the spirals C' and move it into the recess $B^4$, so that the engaging block fits tightly in the recess or groove $B^4$ of the driving pulley B, and power is thereby communicated from said pulley B to the shaft A to cause the revolution of the same.

On the outer periphery of the engaging block C there is arranged a lug E, the purpose of which is to disengage the engaging block C from the friction connection with the driving pulley B, and thereby stop the operation of the shaft A. This lug E is adapted to operate with the releasing device F, connected to and operated by a lever G extending down and operated by a suitable foot lever or treadle or other means. This releasing device F is pivoted on the shaft H secured in the frame of the machine, and extends forwardly and is provided with two forwardly extending arms F' and F², and to the forward end of the arm F² the operating lever G is pivotally connected at F³.

With the shaft A and driving pulley B connected and the shaft in operation, as shown in Fig. 6, if it is desired to disconnect the driving pulley and shaft, the foot is removed from the lever and the rod G and the releasing device F—with its arms F' and F²—move upwardly on the pivot H from the position shown in Fig. 6 to the position shown in Figs. 4 and 5, and in the revolution of the pulley B and engaging block C on the shaft A, the lug E comes in contact with and moves along the inclined side F⁴ of the arm F', and owing to this contacting of the lug E and arm F' the engaging block C is unwound from connection with the driving pulley B and the power of said pulley is not communicated to the shaft A.

With the parts as shown in Figs. 4 and 5 the shaft A and pulley B are disconnected and no power is transmitted from said pulley to the shaft, but when it is desired to cause the connection of said shaft and pulley the operator, pressing on a suitable foot treadle, pulls down the rod G with the releasing device F and its arms F' and F², and as said arm F' passes down from its contact with the lug E, leaving said lug entirely free, the springs D, arranged between the spirals on the shaft and engaging block, exert their tension on said nut and at once screw it up into the recess B⁴ of the pulley B, and as said engaging block unscrews and pinches into the recess B⁴ of said pulley B, the more you turn the pulley the more the engaging block tries to unscrew, and by this means the two form a fixed friction clutch, the tendency of which is to unscrew said pulley rearwardly, but as it cannot be unscrewed from said shaft owing to the washer B² on the rear of the shaft, it carries the shaft with it, and the shaft is kept in revolution until the releasing device F is allowed to assume its upper position, shown in Figs. 4 and 5, when the lug E, in the revolution of the engaging block C, coming in contact with the releasing wedge shaped arm F', stops the revolution of said engaging block and the shaft screwing on to the end unloosens it from the pulley B and moves said engaging block from its friction connection with said pulley B, and the operation of the shaft A is stopped.

I do not limit myself to the exact arrangement and construction shown as the same may be varied without departing from the spirit of my invention.

Having thus ascertained the nature and set forth a construction embodying my invention, what I claim as new, and desire to secure by Letters Patent of the United States, is—

1. In a clutch mechanism, a driving pulley, a shaft adapted to be connected to and disconnected from said pulley, an engaging block mounted on said shaft, mechanism suitably controlled for preventing the engagement of said engaging block and pulley, and independent automatic mechanism for engaging the engaging block and pulley after the operation of said controlled mechanism.

2. In a clutch mechanism, a driving pulley, a shaft adapted to be connected to and disconnected from said pulley, an engaging block mounted on said shaft and having a screw thread engaging with a corresponding screw thread on the shaft, mechanism suitably controlled for preventing the engagement of said engaging block and pulley, and independent automatic mechanism for engaging the said engaging block and pulley after the operation of said controlled mechanism.

3. In a clutch mechanism, a driving pulley, a shaft adapted to be connected to and disconnected from said pulley, an engaging block mounted on said shaft, mechanism suitably controlled for preventing the engagement of said engaging block and pulley, and a spring bearing against said engaging block and held under tension by said mechanism and adapted after the operation of said mechanism to move said engaging block into connection with said pulley.

4. In a clutch mechanism, a driving pulley, a shaft adapted to be connected to and disconnected from said pulley, an engaging block mounted on said shaft and having a screw thread engaging with a corresponding screw thread on the shaft, mechanism suitably controlled and contacting with said engaging block for preventing the engagement of said engaging block and pulley, and independent automatic mechanism for engaging the said engaging block and pulley after the operation of said controlled mechanism.

5. In a clutch mechanism, a driving pulley, a shaft adapted to be connected to and disconnected from said pulley, an engaging block mounted on said shaft and having a screw thread engaging with a corresponding screw thread on the shaft, mechanism suitably controlled for preventing the engagement of said block and pulley, and independent mechanism for engaging the said block and pulley after the operation of said controlled mechanism.

6. In a clutch mechanism, a driving pulley, a shaft adapted to be connected to and disconnected from said pulley, an engaging block mounted on said shaft, mechanism suitably controlled for preventing the engagement of said block and pulley, and independent mechanism for engaging the block and pulley after the operation of the said controlled mechanism.

7. In a clutch mechanism, a driving pulley, a shaft adapted to be connected to and disconnected from said pulley, an engaging block mounted on said shaft, mechanism suitably controlled for preventing the engagement of said block and pulley, independent mechanism for engaging the block and pulley after the operation of said controlled mechanism, and a lug on said block adapted when contacting with said controlled mechanism to move the said block from engagement with the pulley and thereby disengage the shaft and pulley.

8. In a clutch mechanism, a driving pulley, a shaft adapted to be connected to and disconnected from said pulley, an engaging block mounted on said shaft and normally tending to engage with said driving pulley, and mechanism suitably controlled for preventing the engagement of said block and pulley, and independent mechanism for engaging the block and pulley after the operation of the said controlled mechanism.

In testimony whereof I have signed my name to this specification, in the presence of two subscribing witnesses, on this 21st day of January, A. D. 1895.

ERASTUS WOODWARD.

Witnesses:
   N. M. SMITH, Jr.,
   S. H. TROW.